(12) United States Patent
Ow (10) Patent No.: US 6,382,560 B1
(45) Date of Patent: May 7, 2002

(54) HIGH SPEED VERTICAL TAKE-OFF AND LAND AIRCRAFT

(75) Inventor: Gordon Y. W. Ow, Long Beach, CA (US)

(73) Assignee: GO Aircraft Ltd., Long Beach, CA (US)

( * ) Notice: Subject to any disclaimer, the term of this patent is extended or adjusted under 35 U.S.C. 154(b) by 0 days.

(21) Appl. No.: 09/655,966

(22) Filed: Sep. 6, 2000

Related U.S. Application Data (60) Provisional application No. 60/155,863, filed on Sep. 24, 1999.

(51) Int. Cl.[7] ............................................. B64C 29/00
(52) U.S. Cl. ..................... 244/23 C; 244/12.5; 244/12.2
(58) Field of Search ............................. 244/23 C, 12.5, 244/23 R, 12.1, 12.2, 73 C, 23 B, 23 D, 20 R, 20 A (56) References Cited

U.S. PATENT DOCUMENTS

| | | |
|---|---|---|
| 2,667,226 A | 1/1954 | Doblhoff |
| 2,863,621 A | 12/1958 | Davis |
| 2,988,152 A | 6/1961 | Katzenberger et al. |
| 3,182,929 A | 5/1965 | Lemberger |
| 3,327,969 A | 6/1967 | Head |
| 3,514,053 A | 5/1970 | McGuinness |
| 4,452,410 A | 6/1984 | Everett |
| 4,773,618 A * | 9/1988 | Ow ........................ 244/23 C |
| 5,039,031 A | 8/1991 | Valverde |
| 5,507,453 A | 4/1996 | Shapery |
| 5,738,302 A * | 4/1998 | Freeland .................. 244/23 R |

* cited by examiner

*Primary Examiner*—Michael J. Carone
*Assistant Examiner*—Timothy D Collins
(74) *Attorney, Agent, or Firm*—King & Schickli PLLC (57) ABSTRACT

A high-speed vertical take-off and land (HSVTOL) aircraft includes a disk-shaped fuselage wit a rotatable fan having a nozzle ring driven by hot jet gasses and fan air from jet engines. Feed ducts and an annular plenum, have a composite duct-in-duct configuration to separate the hot gases from the relatively cool fan air. High efficiency air bearings serve to support the rotatable fan assembly on the fuselage in the vertical direction, and rollers around the perimeter provide horizontal support and stability. A bearing and seal interface hub and other components, are isolated from the hot gases. The combined exhaust is ejected downwardly at approximately 15° for maximum fan spin and provide direct reaction lift. The fan blades are angled at approximately 57° with moveable airfoil portions and stationary trailing flap portions to provide maximum lift and down wash. Various diverter valves and bypass doors are provided for hot gas/air control. Decoupler valves can interrupt all flow for engine out operation. Control of the pitch, roll and yaw is provided by aero flaps providing control surfaces in the path of the down wash. When twisted about a substantially horizontal control axis, the flaps generate lift, as well as being modulated for attitude control. Aerodynamic disk-shape of the fuselage provides high lift, low drag necessary to support the efficient high speed performance. A control circuit includes an on board CPU controller that operates and coordinates all functions through the various actuators, valves, transducers and other control components.

20 Claims, 10 Drawing Sheets

Fig. 6b

HIGH SPEED VERTICAL TAKE-OFF AND LAND AIRCRAFT

PRIORITY

This is a utility application with priority under 35 USC 120 based on the provisional application, Serial No. 60/155,863, filed Sep. 24, 1999.

U.S. GOVERNMENT RIGHTS

This invention was made with Government support under Contract DAAH01-98-C-R156 awarded by the U.S. Army Aviation and Missile Command. The Government has certain rights in this invention.

BACKGROUND OF THE INVENTION

The present invention relates to aircraft; and more particularly, to an aircraft with improved features for enhanced vertical take-off and landing (VTOL) capabilities and high speed (HS) horizontal flight.

Conventional relatively high speed, winged aircraft require long runways for take-offs and landings. In the civil aviation world, this is a significant disadvantage since the pressure for land conservation becomes more and more intense as the population, especially in city and suburban areas, continues to grow. It is also a disadvantage in the military world, since as is well known it is a very distinct advantage to be able to take-off and land without a runway as close to the combat zone as possible, and to deliver as much of a payload as possible. Also, by removing the need to maintain air bases with runways frees up scarce funds for other projects and military personnel for other duties.

Furthermore in the civil/commercial world, there is a significant disadvantage for runway takeoffs and landings in that the aircraft must line up and wait for longer and longerperiods. As the air traffic increases this wait will become more intolerable. Thus, significant advantages in both the domestic and military air travel can be realized by development and successful deployment of HSVTOL aircraft.

Because of these basic long standing shortcomings of fixed wing aircraft and others, VTOL aircraft are establishing more of a presence in the world market, along with more and more helicopter usage. However, none of these newest entries into the field offer the high speed, range and increased payload capability that is needed to fill both the domestic, as well as the military air needs. The closest conceptual approach to providing the answer to these needs is set forth in my prior U.S. Pat. No. 4,773,618, issued Sep. 27, 1988, and which is the predecessor to the present invention.

As set forth in the '618 patent, there have been numerous attempts in the past to provide a VTOL capable aircraft with relatively high speed horizontal flight capability, as well as acceptable payload and range. Such approaches run the gamet from aircraft that take-off and land in a vertical attitude and then switch to a horizontal attitude for flight, to an aircraft with separate engines for vertical and horizontal flight. These have not met with success, primarily because of the complexity and high cost. One reasonably successful military aircraft is the British Harrier AV-8A & B. This fixed wing aircraft provides limited length runway take-off and landing capability by direct downward vectoring of the hot exhaust gases of the jet engines. Except for the standard helicopters, the only other production aircraft with some vertical take-off and landing capabilities is the U.S. V-22 tilt-rotor fixed wing aircraft, jointly produced by Bell/Textron and Boeing. The first aircraft has far too limited payload and range and the second aircraft has far too limited speed and range.

A recurring problem that continues to plague the development of a truly successful VTOL, including the two described above, is that, compared to conventional aircraft, more than twice the thrust is required for vertical take-off and landing. This requirement alone prevents the aircraft of this type from being successful since the jet engines have to be substantially twice as large. This factor alone makes the aircraft in a particular payload class prohibitively expensive in terms of initial cost, as well as for everyday operation and maintenance.

As far as is known today, my own HSVTOL design of the '618 patent basically fills these needs. It also solves the problem of efficient attitude control of the aircraft, during both vertical and horizontal flight. The attitude control does not depend on exhaust jet reaction, but instead utilizes in part modulated control of the fan blades of the annular fan assembly that extends around the periphery of the air craft. This design provides greater stability through gyroscopic control, as well as increased maneuverability, and generally more efficient operation. Also, it has the inherent capability of increasing the speed in horizontal flight, and enlarging the payload. The increased efficiency of operation in either mode of operation is proven. With this basic design, the problem of the concentrated, very high temperature, vertical blast of jet exhaust gases being expelled directly from the jet engines against the ground that tend to cause damage to the aircraft and surrounding personnel, as well as to the landing pad, is eliminated.

From the foregoing background review, it is apparent that the next step to advance this technology should be to build on the HSVTOL design of the '618 patent. Such a redesign of the aircraft would provide for more efficient utilization of jet engine thrust leading to even better performance, increased payload and extended range. Such improvements would focus on structural changes that would allow use of lighter weight materials, particularly in the area of the fan assembly. Such an advance would be provided in part by a unique system for incorporating highly efficient fan jet engines for propulsion, and handling the hot core gases and the surrounding fan air in a novel manner. The new approach would also lead to less expensive materials to be used in the ducting to deliver the high energy gases to the fan assembly. Other components and structural changes would also add to a better performing and reliable aircraft, such as a redesign of the interface hub between the fuselage and the fan assembly. This need includes a better performing bearing and seal arrangement. Another area of primary advance over my prior design would be in improving aircraft attitude control and maneuverability, while at the same time greatly simplifying the system needed for this purpose.

SUMMARY OF THE INVENTION

Accordingly, it is the primary object of the present invention to provide an improvement over my prior vertical take-off and landing aircraft for improved performance, allowing substantially increased payload and extending range, along with additional improvement in the control capabilities, especially during vertical flight, and further improving the high speed horizontal flight operation.

Another object of the present invention is to provide an arrangement that allows use of the lighter weight materials that are important for increasing the performance, most notably in the fan assembly and in the plenum.

It is still another object of the present invention to provide the unique system for incorporating highly efficient fan jet engines coupled with handling the hot core gases and the surrounding fan air so as to give maximum thrust, both vertically and horizontally, and at the same time protecting critical components of the aircraft during operation.

It is still object of the present invention to provide improved aircraft attitude control and maneuverability by incorporation of aero flaps with control surfaces positioned in the down wash of the fan assembly.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

In order to achieve these objectives and to do so in accordance with the purposes of the present invention, a redesigned aircraft of the HSVTOL category is provided, and particularly the aircraft has features that are an advance over the aircraft of my previous '618 patent. The advances feature the use of fan jet engine to provide separate hot core gas and fan air to drive the annular fan assembly, and aero flaps with surfaces for attitude control. The new aircraft incorporating these and other features provides more efficient vertical take-off and landing capabilities coupled with its supersonic speed performance in horizontal flight. Furthermore, a key advance is made in terms of increased payload and range. Unlike prior VTOL aircraft of very limited capabilities, the present invention is adaptable in this respect to the increased travel needs of today's modern aviation world, both in the civil and military arenas. With regard to these basic concepts, the present invention is an extension of the concepts and structures of the aircraft shown in my prior U.S. Pat. No. 4,773,618, and this patent is incorporated herein as a reference in its entirety.

A disk-shaped fuselage preferably supports three fan jet engines; one engine mounted in a pod along the center axis of the aircraft and two side engines submerged within the fuselage. Alternatively, a disk shaped fuselage with two side engines submerged within the fuselage can be used. Around the periphery of the aircraft is the redesigned rotatable fan assembly having an array of fan blades extending at an approximately 57° angle when fully opened to operative position, that provides enhanced vertical lift during take-off and landing, Inboard of the fan assembly is a nozzle ring having a plurality of nozzles that are angled downwardly at a lesser angle, approximately 15° for the purpose of more efficiently ejecting the exhaust from the fan jet engines. The positioning of the nozzles provides maximum thrust to rotate the fan assembly, and at the same time provide direct jet reaction lift to the aircraft.

The rotational thrust is provided primarily by the action/reaction of the mixed, high energy gases being ejected from the nozzles $20-20_{n+1}$. The boundary layer of the jet streams may entrain additional air from the surroundings in the nozzle ring.

The hot exhaust core gases and the fan air are delivered separately to the nozzles through the re-engineered plenum, but may be mixed in the nozzles just before ejection. The circular array of nozzles receives the exhaust from composite duct-in-duct feed ducts connected to each of the jet engines and delivered through the annular composite duct-in-duct plenum. Both the feed ducts and the annular plenum are specifically designed to separate the core gases from the relatively cool fan air for very important purposes. The fan air in an outer duct of the duct-in-duct configuration isolates the hot core gases in the inner duct. This arrangement allows lighter materials to be used and also protects the surrounding aircraft structure and operating components, such as the critical annular bearing and seal combination for the fan assembly.

The fan blades of the fan assembly include a leading section and a center section that make up an airfoil portion, and a stationary trailing flap portion. When the fan blades are pivoted to their up or operative position, the airfoil portion provides maximum lift. In addition to the area of low pressure induced by air flow over the airfoil portion, the under surface of the blades provide for high dynamic pressure and energy down wash to enhance the lift function. To control the lift, the positioning of the fan blades, and thus the lift, can be modulated in response to the aircraft's onboard CPU controller.

In order to direct the hot core exhaust gases into the feed ducts and annular plenum from the fan jet engine for delivery to the nozzles of the nozzle ring, diverter valves are provided. Also, bypass doors on the engine thrust nozzles, when closed, provide a way to force the fan air into the feed ducts and the plenum. During the transition to horizontal flight, the diverter valves and bypass doors are opened to switch the composite exhaust to provide forward thrust to the aircraft. At the same time, the fan blades of the fan assembly are gradually pivoted to a closed position to provide maximum aerodynamic lift over the aircraft. Because of the separation of the hot core gases from the fan air throughout the system until being partially mixed in the nozzles, only the inner ducting of the feed ducts and plenum must be fabricated of a high heat resistant material, such as Inconel metal. The outer ducts can be fabricated of aluminum, or other lightweight materials, such as carbon composite plastic or fiberglass. Similarly, since the ejected exhaust does not pass through the fan blades as in my previous '618 design, the material used can also be lightweight and inexpensive, and most notably fiberglass/carbon composite reinforced material works well in this instance also.

An important aspect of the present invention is the provision of aero flaps providing control surfaces positioned in the path of the high energy down wash of the fan assembly during vertical flight and a portion of transition to horizontal flight and also into the free air-stream during horizontal flight. Enhanced attitude control, including control of the pitch, roll and yaw of the aircraft is now possible with a substantial savings also in terms of weight, complexity and expense. There is no longer any need to cyclically operate the eyeball valves in the fan blades, as before, since all that is needed is controlled and coordinated actuation of the aero flaps by the on-board controller. It is contemplated that the: side aero flaps not only provide for attitude control (about the aircraft pitch axis), rat but also serve to provide control for any stray gyroscopic forces that are induced during operation. Rear aero flaps are also positioned in the down wash of the fan assembly (during vertical flight) and assist in providing attitude control about the aircraft roll axis. Both sets of aero flaps are adjustable about dual axes.

The aero flaps are positioned in a straight down position when the controller calls for offering no attitude control input. This is typically used during vertical flight. During high, speed, low drag horizontal flight when lift over the top aerodynamic surface is sufficient and there is no call for maneuvering, the aero flaps are positioned along a line that passes through the aircraft center of gravity. From this position during horizontal flight when maneuvering is desired, the aero flaps are twisted oppositely into the free stream air to create rolling torque for pitch control as required. In vertical flight and when optimum control is needed, the flaps are rotated about their positional axis to a position directly across the down wash. In addition to movement about the positional axis, each flap can be pivoted or twisted about its 90° spaced control axis to provide infinite variation in the roll control from side to side, or in a pitching motion fore and aft when the set of rear aero flaps is involved in the control operation. Thus, the flapping about the positional axis and twisting about the control axis of the aero flaps in concert can provide any composite motion required by the controller during vertical or horizontal, or in transitional flight in between.

The interface hub of the fuselage, where the separated hot core gases and fan air are transferred to the nozzle ring, includes a highly efficient peripheral array of air bearings for vertical support of the rotatable fan assembly. An array of rollers are rotatably mounted in the hub on vertical axes spaced around the perimeter of the fuselage and provide horizontal support and stability. Viable alternatives to these bearings include all air bearings, all roller and/or foil bearings. A peripheral brush seal is positioned on the fuselage side of the interface hub to contain the flow of the fan air. Advantageously, the hot core gases remain isolated in the center of the duct-in-duct plenum at this point so that the bearings and seal components are protected.

The onboard CPU controller forms the heart of the aircraft control circuit. Operation is through pilot inputs to the control stick, as well as inputs from attitude transducers on the aircraft. Through the CPU controller, all components are operated in concert with each other to provide the highly efficient vertical take-off/landing mode, as well as the transition to and sustained high speed, horizontal flight mode. Through interaction of the various control elements, the aircraft is made highly efficient in all aspects of its operation.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIGS. 5–5c show the aircraft exhaust system with parts exploded and broken away for clarity, illustrating in greater detail for a further understanding the plenum and fan assembly of the present invention; and more specifically.

Reference will now be made in detail to the present preferred embodiment of the invention, an example of which is illustrated in the accompanying drawings.

DETAILED DESCRIPTION OF THE INVENTION

Figure 1:
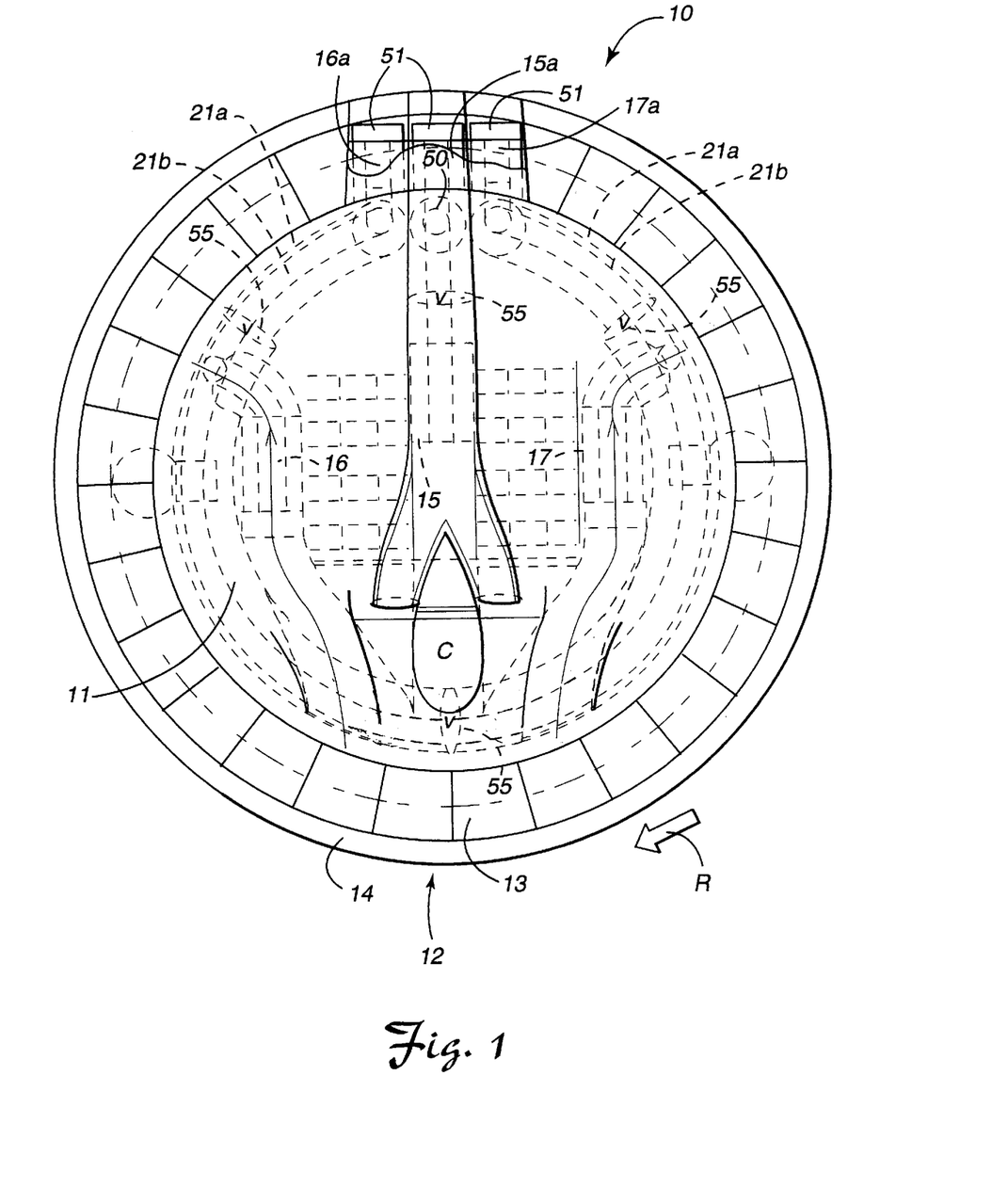
FIG. 1 is an overall top view of the HSVTOL aircraft of the present invention, illustrating in dashed line outline the schematic arrangement of the fan jet engines and composite feed ducts, plenum and other components.
Figure 2:
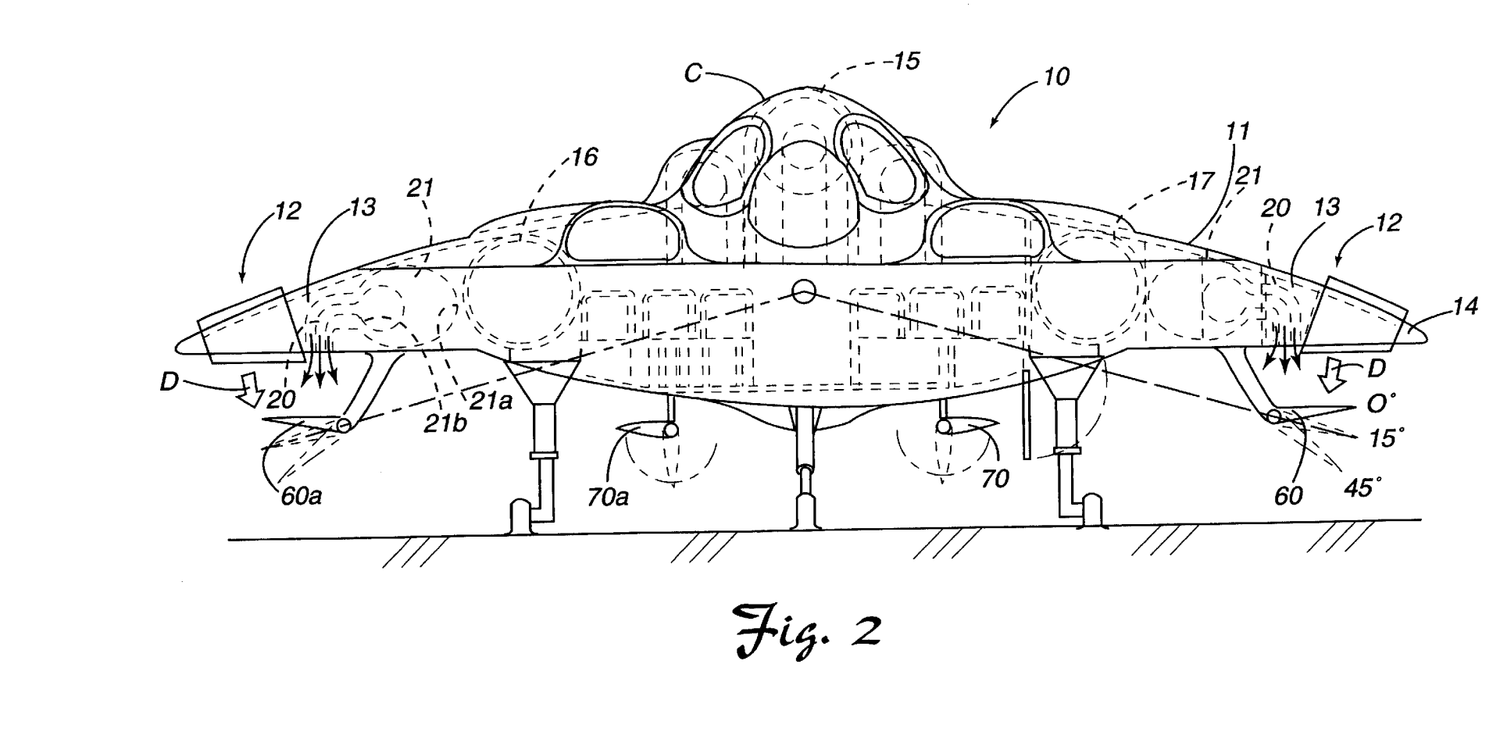
FIG. 2 is a front overview of the aircraft with the landing gear down and illustrating the dashed outline of the duct-in-duct plenum, the fan assembly including the nozzle ring and nozzles and the side and rear sets of aero flaps.
Figure 3:
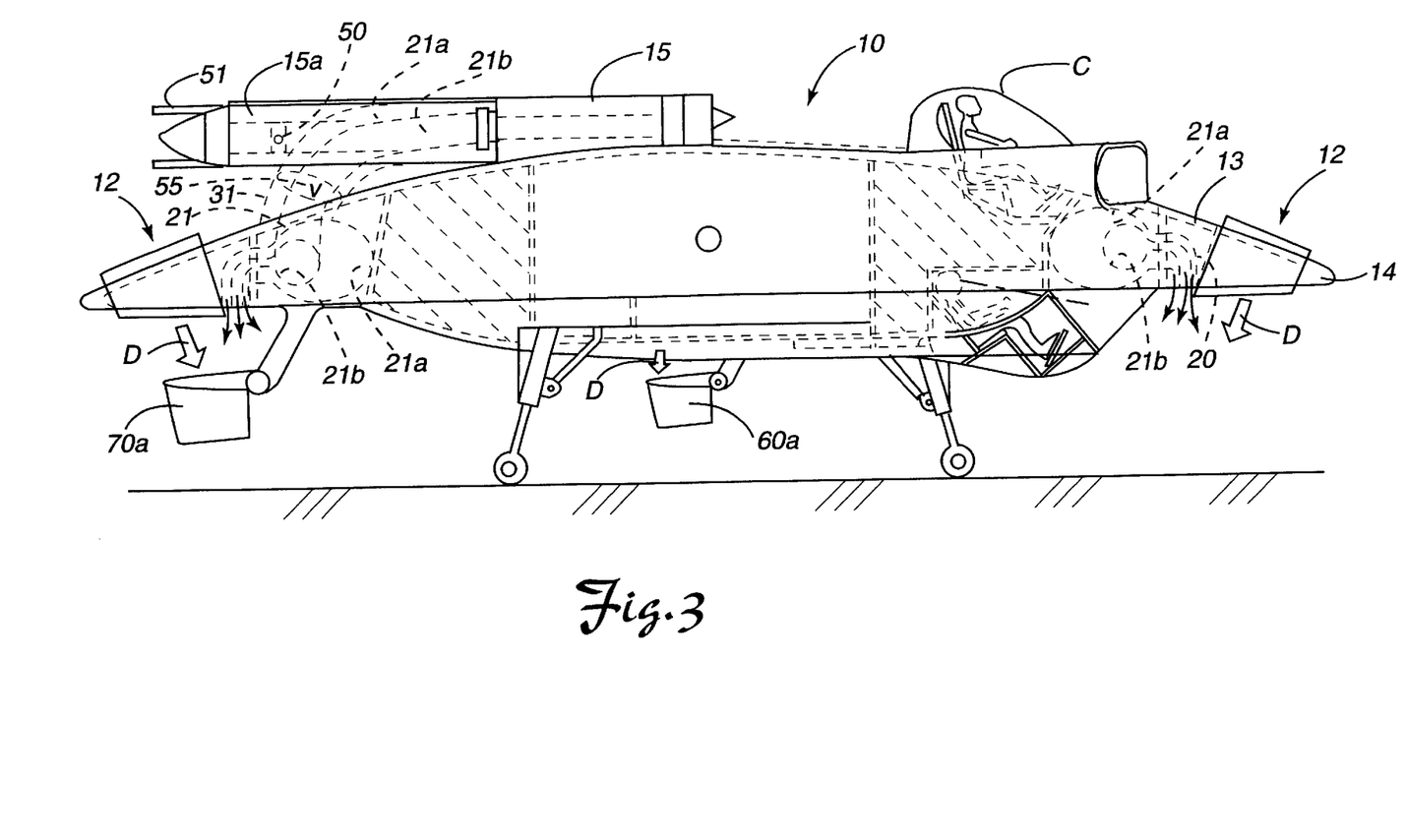
FIG. 3 is a side view showing basically the same overview of the system of FIG. 2 but from a 90° perspective to that of FIG. 2.

With reference now to FIGS. 1–3 of the drawings, there is shown an aircraft 10 of the HSVTOL design of the present invention. As indicated, from a basic design perspective, it is a successor to the aircraft of my prior U.S. patent '618 that is now incorporated by reference. The center of the aircraft 10 is formed by a disk-shaped fuselage or body, generally designated by the reference numeral 11. An outer fan assembly 12 surrounds the fuselage and includes an inboard nozzle ring 13 with the perimeter being defined by a full periphery rim or shroud 14. As will be seen more in detail below, the interface between the fuselage 11 and the nozzle ring 13 is provided with a rotary bearing and seal arrangement that allows the fan assembly 12 to freely rotate with respect to the fuselage 11. As described, the rotary motion is in the clockwise direction, and as generally represented by the action arrow R in FIG. 1. A pod mounted fan jet engine 15 extends along the horizontal axis of the aircraft 10 with a split intake positioned on the sides of the pilot canopy C. Two additional fan jet engines 16 and 17 are viewed in dashed line form since in this preferred embodiment these two engines are submerged within the fuselage 11.

The front view of the aircraft 10 is illustrated with landing gear (not numbered) deployed for positioning on the ground. In this view, as well as in FIG. 3, there is an elevation view of the fan assembly 12, including the nozzle ring 13, with an individual nozzle 20 shown at all four quadrants of the aircraft 10. These nozzles 20, thus form an array of spaced nozzles extending around the full periphery of the aircraft (make reference to FIGS. 1 and 5c).

The exhaust from the fan jet engines 15–17 is provided to the nozzles 21 through an annular, composite duct plenum. This duct-in-duct configuration forms an important aspect of the present invention. Specifically, outer duct 21 a contains only relatively cool fan air (200° F.–400° F.) from the annular fan section of the engines 15–17; whereas, the hot core gases (700° F., to as high as 2000° F.) are segregated in the inner duct 21b. It will be realized that this separation is maintained in the aircraft 10 so as to allow the use of the lighter weight and less expensive duct material and to protect the components from the deleterious effects of the core gases.

Figure 4:
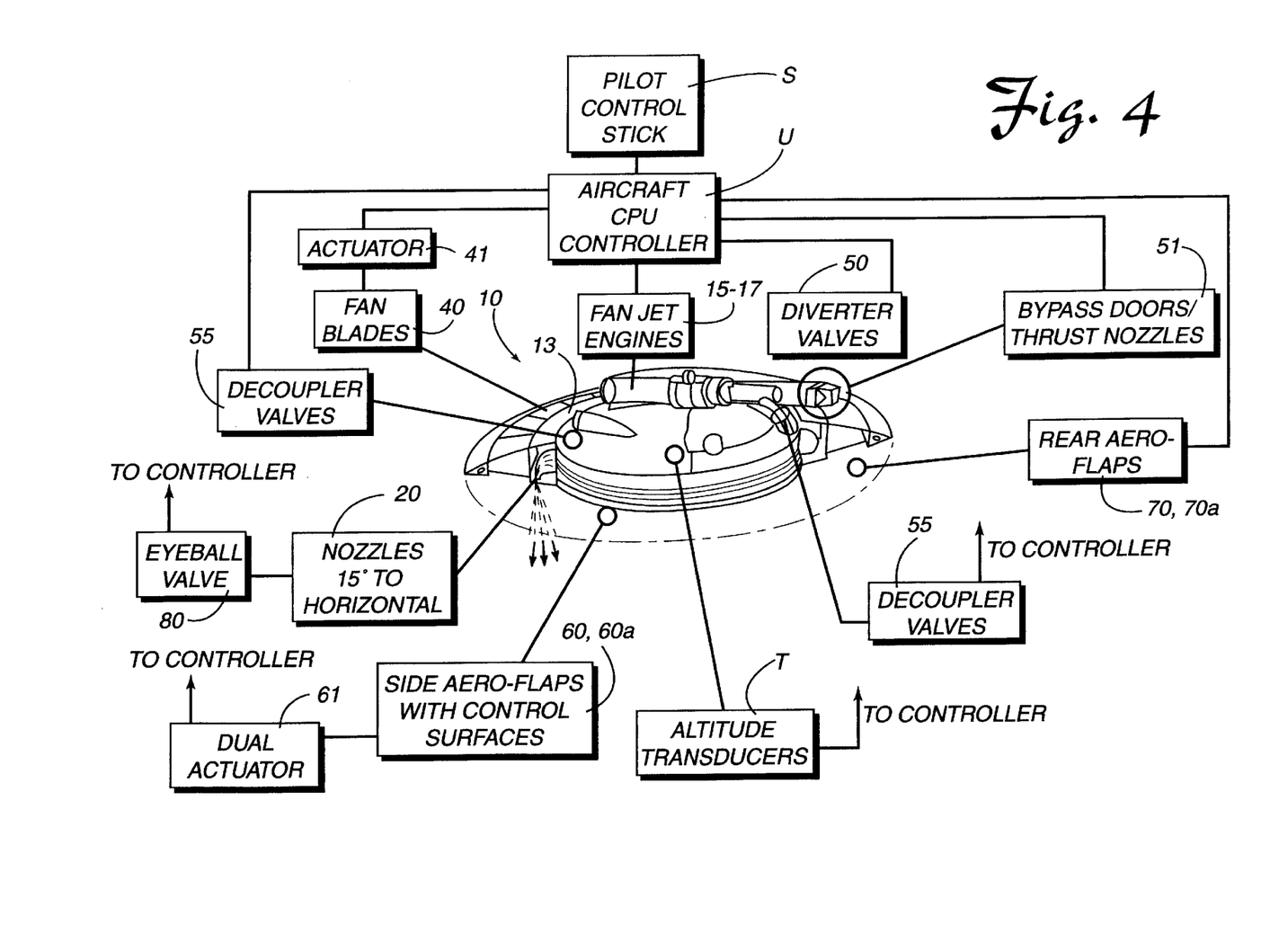
FIG. 4 is an overall schematic drawing of the control circuit, including showing the aircraft with the various components positioned and designated generally as to their location.

A more complete perspective of the entire HSVTOL aircraft 10 and its control system can be obtained by reference to FIG. 4. An onboard CPU controller U operates the engines 15–17, as well as all of the other components, as will be set forth below. A control stick S, or similar manual or automatic interface is employed by the pilot to fly the aircraft through the controller U. Flight attitude transducers T can also provide input.

Figure 5:
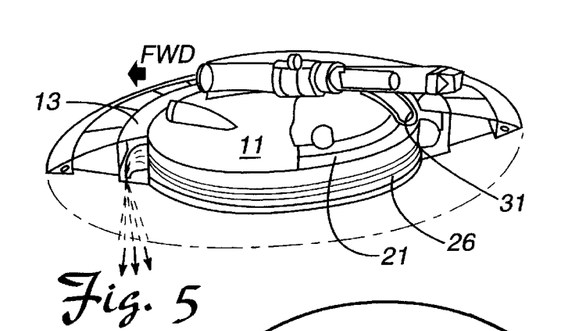
FIG. 5 illustrates the fuselage and nozzle ring in assembled relationship to the fan assembly, FIG. 5a with the fuselage removed to show the plenum with its feed ducts, FIG. 5b with the plenum in place within the nozzle ring and FIG. 5c with an enlarged cutaway from FIG. 5b illustrating the inboard nozzle ring in relation to the fan assembly.
Figure 5A:
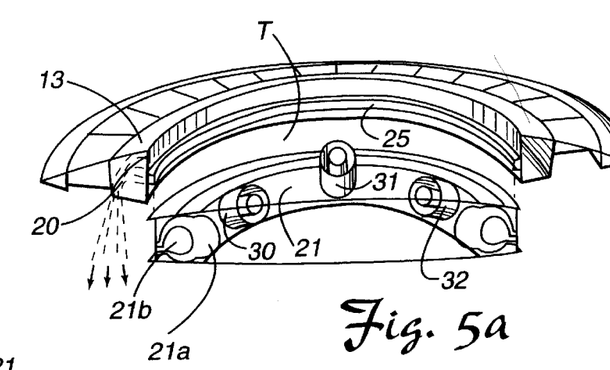
Figure 5B:
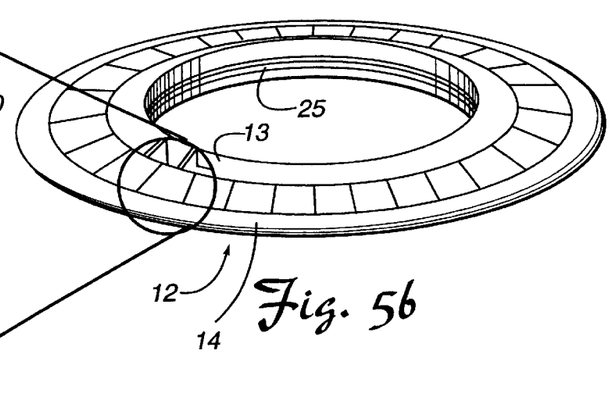
Figure 5C:
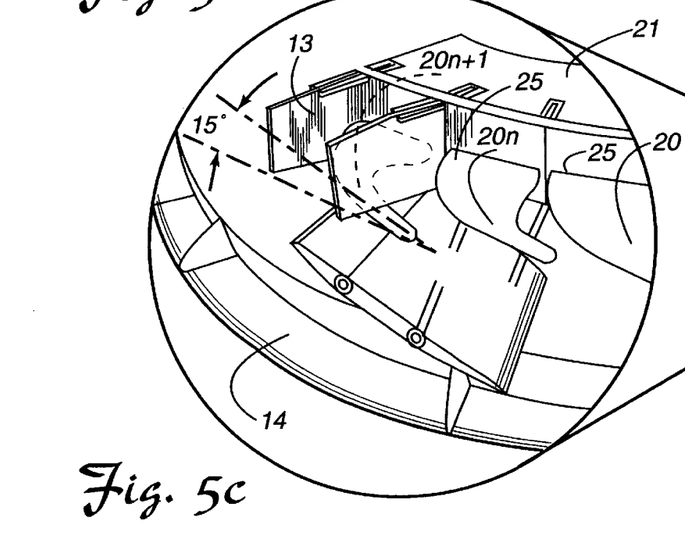

As illustrated, by viewing FIGS. 4 and 5–5c of the drawings, the nozzle ring 13 is the component of the fan assembly 12 that is mated with the outer periphery of the fuselage 11. Each of the nozzles 20, $20_n$, $20_{n+1}$ are held in a separate segment of the nozzle ring 13 (see FIG. 5c). Between the nozzle ring 13 and the plenum 21 (see FIG. 5a) is a transition zone through which the exhaust is transferred to the nozzle ring 13. A peripheral series of nozzle intake receptors 25 are formed on the inboard face of the nozzles 20. Similarly, a plurality of matching feed orifices 26 (see FIG. 5) are positioned peripherally around the fuselage 11 and communicate with the composite plenum 21. Through these interacting orifices 26, and the rapidly moving receptors 25, the supply of the jet separated exhaust core gases and fan air is efficiently transferred (see FIG. 9). The supply to the plenum 21 from the three fan jet engines 15–17 occurs through feed ducts 30, 31, 32, respectively. As illustrated in FIG. 4a, as well as FIG. 5a, each of the feed ducts includes inner duct 21b for the hot core gases from the respective fan jet engine and outer duct 21a for the fan air. As an example of the three feed ducts, a schematic illustration of how the gases are separated upstream from jet engine thrust nozzle 15a is illustrated in FIG. 4a. Thus, the relatively coot fan air is carried in the outer annulus of each of the feed ducts; whereas the hot core gases are confined in the center.

The flow from the feed ducts 30–32 remains divided when fed into the respective outer duct 21a and the inner duct 21b. Also, this separation is advantageously maintained throughout the circular length of the plenum 21 until the exhaust: passes across the transition zone and into and mixed in the receptor's 25 of the individual nozzles $20-20_{n+1}$. As will be seen more in detail, the outer annulus of cool fan air is effective to protect the bearing and seal arrangement and other components within the aircraft 10. Of significant importance also is the fact that only the smaller inner duct 21b must be fabricated of high temperature material, such as Inconel alloy metal. The outer duct 21a can be fabricated of an aluminum alloy or other relatively low temperature materials, such as fiberglass or carbon fiber reinforced plastic resin material.

The exhaust from the nozzles $20-20_{n+1}$ extends down at an approximately 15° angle and is ejected at high speed at this optimum angle through a restricted nozzle orifice (see FIG. 5c). The nozzle ring 13 being inboard of the fan assembly 12 provides the appropriate spin action to the fan assembly without interference with the individual fan blades (see FIG. 5c).

After transitioning from vertical to horizontal flight, the exhaust of the fan jet engine 15 is gradually redirected through extension ducting and out of the tailpipe 15a (see FIG. 3). Similarly, the engines 16, 17 have tailpipes 16a, 17a for horizontal cruise propulsion (see FIG. 1). Advantageously, the redirection of flow from these engines 16, 17 takes place directly through the section of the composite duct plenum extending along the aft quadrants of the aircraft (see FIG. 1).

Figure 6:
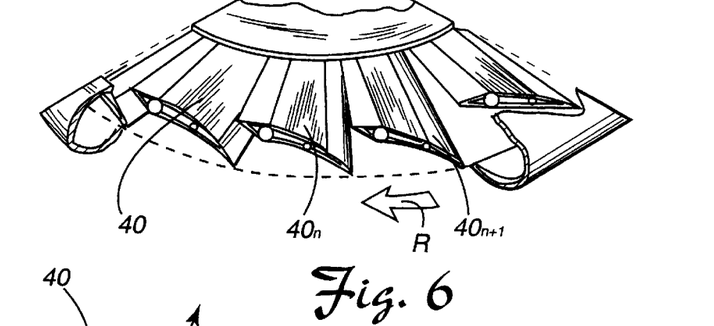
FIG. 6 is a cutaway, simplified view of a section of the fan blades within the fan assembly and including the peripheral rim or shroud broken away for a analysis of the fan blades in the open, raised approximately 57° lift position.
Figure 6A:
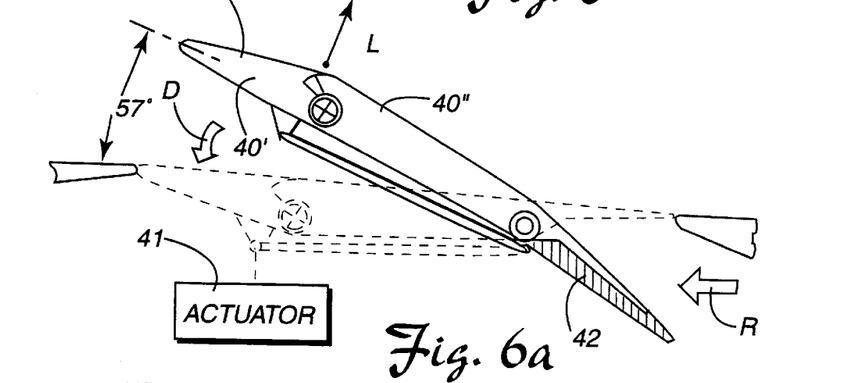
FIG. 6a is an enlarged, also simplified, side view of an individual fan blade, and illustrating both of the blade positions during operation, from the open, raised position for vertical flight to the closed, lower position for low drag, high speed horizontal flight operation.

Viewing FIGS. 6, 6a, the fan assembly 12 comprises a selected number of individual fan blades 40, $40_n$, $40_{n+1}$, illustrated rotating in the clockwise direction, and as noted by the action arrow R. These blades extend upwardly at a selected angle of attack. It has been found that an approximately 57° angle provides the maximum lift and down wash action (note the lift arrow L and down wash arrow D).

Thus, the pressure differential over the airfoil-shaped fan blades $40-40_{n+1}$ provides the lift for the aircraft 10, along with the downwash action. The gases from the nozzles $20-20_{n+1}$, are inboard in the nozzle ring 13 and also add lift, but without direct interaction with the blades $40-40_{n+1}$ (see FIG. 9).As illustrated; each blade 40 includes a leading section 40' and a center section 40" that together form the airfoil portion of the blade 40. When the blade is lifted to the operating position for take-off or landing, the pivot allows the airfoil to be formed to provide the desired enhanced lifting action. The fan blades 40 are lifted into position by an actuator 41 and when lowered form a smooth surface across the top skin of the aircraft 10 in order to provide aerodynamic lift. A trailing flap portion 42 is stationary and remains in the position designated in either mode.

Figure 4A:
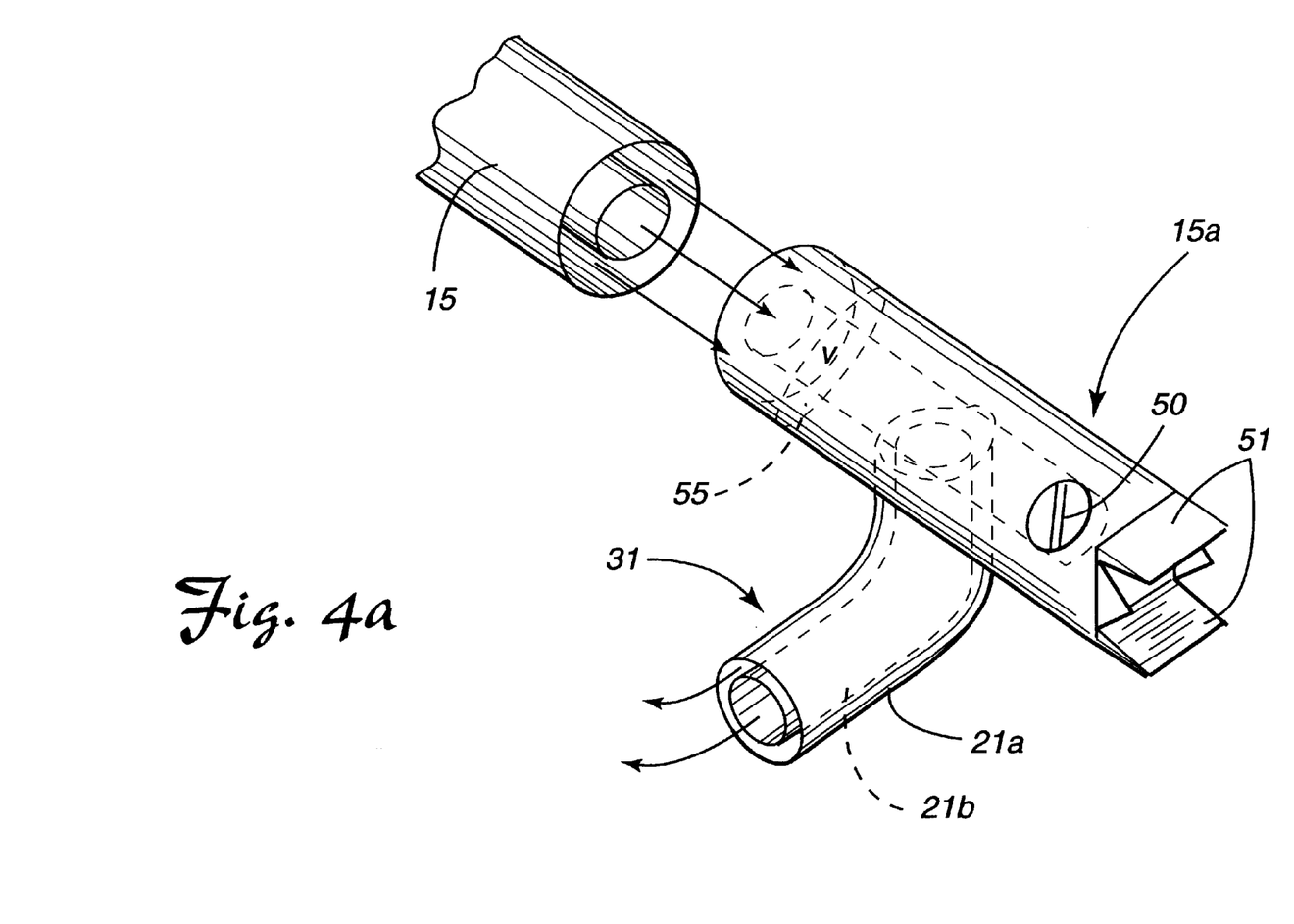
FIG. 4a is a schematic cut-away illustration showing separation of the core gases from the fan air in the feed duct for the plenum as diversion occurs adjacent the thrust nozzle for the fan jet engine.

For vertical flight during take-off and landing, substantially all of the exhaust, both the hot core gases and the fan air, is directed into the composite feed ducts 30–32 and the composite duct plenum 21. To do this, the outlet ducting upstream of the thrust nozzle of the engine 15 includes a diverter valve 50, such as shown adjacent tailpipe 15a of the engine 15 (FIGS. 4, 4a). When closed, the hot core gases are diverted into the inner duct 21b. In addition, each of the nozzles includes bypass doors/two dimensional thrust nozzles 51 that can be closed to force the cool fan air back into the outer duct 21*a* of each of the feed tubes 30–32 and also used to accelerate exhaust flow to sonic speeds in order to produce optimum thrust in horizontal flight. Similar diverter valves and bypass doors for the submerged engines 16, 17 are illustrated schematically in FIG. 1 (same numbers). During vertical flight, upon closing the valves and the doors of all three engines, the maximum composite exhaust can then be circulated through the plenum and outwardly through the nozzles 20–20$_{n+1}$. Due to the high lift efficiency of the fan assembly 12 of the present invention, the exhaust flow through the nozzles controlling the speed of the engines 15–17 and/or the angle of attack of the blades 40, may have to be limited for take-off and landing of the aircraft 10.

Figures 9, 9A:
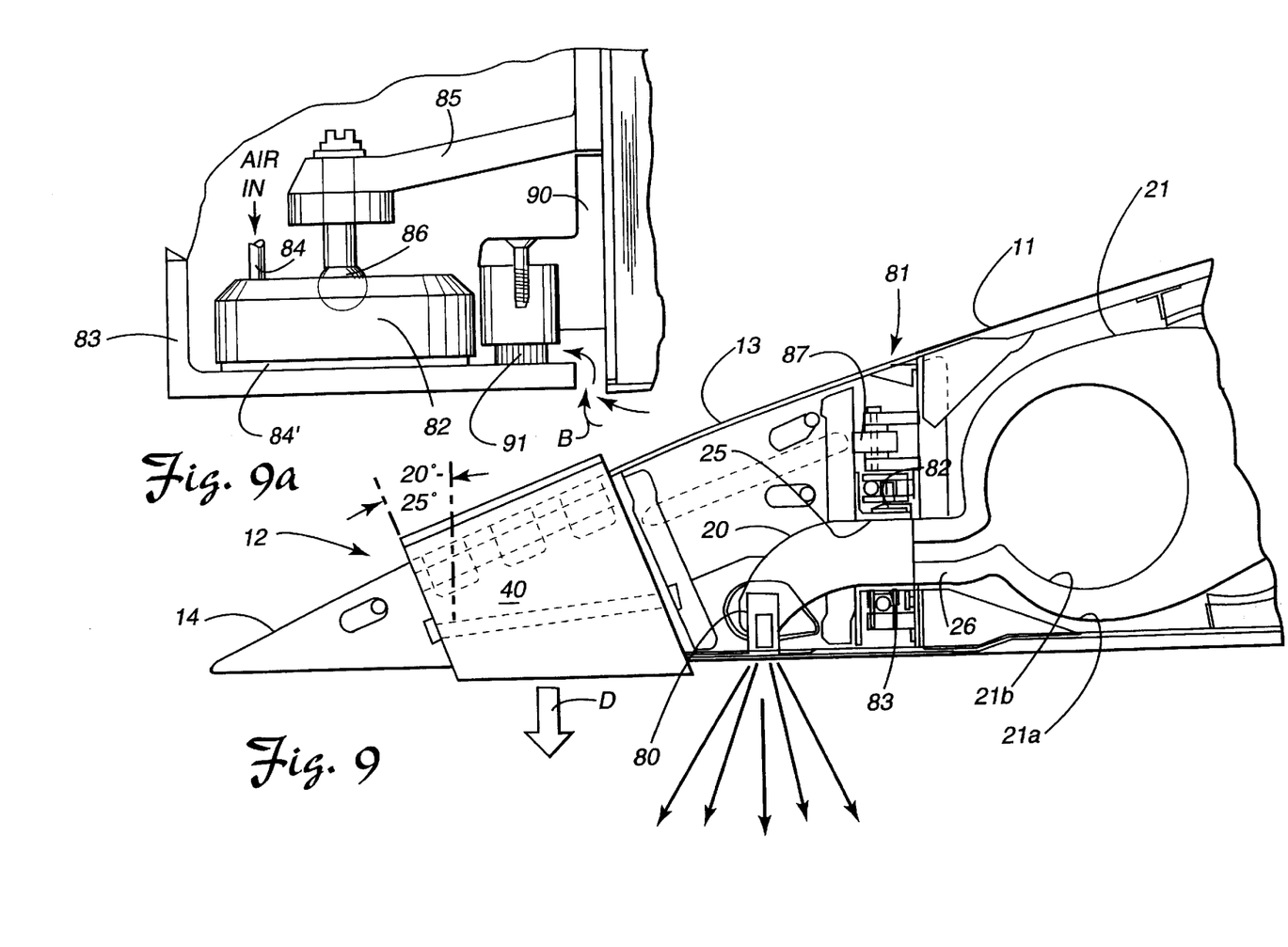
FIG. 9 is an enlarged cross sectional view in the transitional area between the fuselage and the fan assembly illustrating in detail the fan assembly and the annular interface hub of the fuselage.
FIG. 9a is a further enlarged, partial cross sectional view of an air bearing module and the peripheral brush seal positioned in the annular hub of the fuselage.

As best illustrated in FIGS. 2 and 9, the upper, leading edges of the open-ended fan blades 40 extend above the upper surface of the aircraft 10. A significant increase in air flow is induced into the fan flow channel with this arrangement since the air is free to enter laterally, as well as in front of the leading edge of each blade 40. Also, the flow channel is designed to extend at an approximately 20°–25° angle with respect to the rotational axis (see FIG. 9). This inward slope of the channel (and the blades 40) provides a higher thrust output by placing the forward internal surface of the channel more normal to the outward radial component of flow.

In addition to the diverter valve 50, three backflow decoupler valves 55 are interposed in the plenum 21 at approximately the 12, 4 and 8 o'clock positions, as illustrated in FIG. 1. These valves are normally open, but can be closed in order to decouple individual fan jet engines 15–17 in the event that a particular engine is no longer operating to prevent backflow or adjust back pressure on the engines. As shown in FIG. 4*a*, a decoupler valve 55 is located across both ducts 21*a*, 21*b* and can be closed to isolate engine 15 should it no longer operate.

Figure 6B:
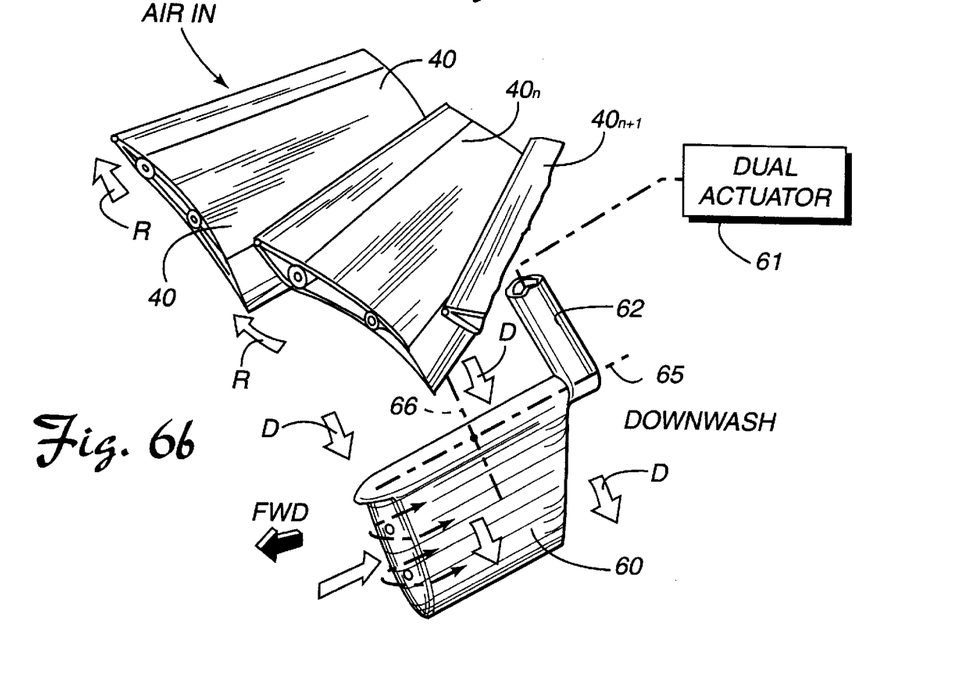
FIG. 6b is a simplified showing of the positioning of one of the set of the side aero flaps underneath the fan assembly in the path of the down wash for providing control functions of the aircraft in accordance with the principles of the present invention.
Figures 7, 7A, 7B:
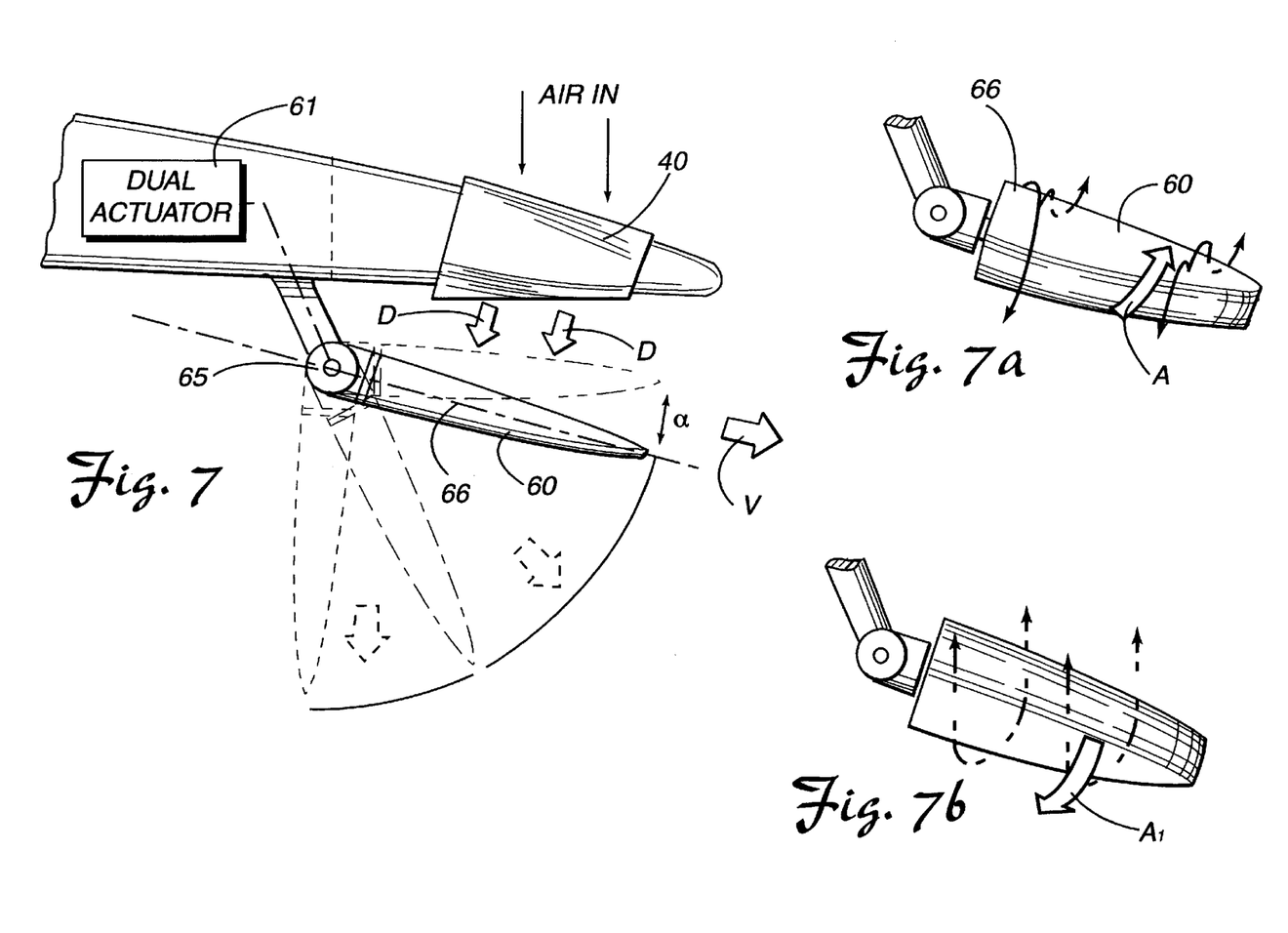
FIG. 7 is another simplified view of the side aero flap, but looking from a forward perspective illustrating the fan assembly providing down wash against the upper control surface of the aero flap at a 15° setting, and providing dashed line alternative positions of the aero flap to provide different operating characteristics.
FIGS. 7a and 7b provide an illustration of the manner of control of the aero flap as shown in FIG. 7, viewed from the same 15° position about the positional axis, but with a twisting motion having been induced -around the control axis to provide either lift or down force, respectively.

In accordance with another important feature of the present invention, side aero flaps 60, 60*a* are provided underneath the aircraft in order to provide attitude control of the aircraft, including primarily control of pitch by creating roll torque. As can be seen in FIGS. 2 and 6*b*, each of the aero flaps 60, 60*a* includes a dual actuator 61 (see also FIG. 4). Each of the flaps is supported by a depending strut 62 to locate a positional axis P (see FIG. 6*b*). Particularly, the aero flap 60 is positioned in the down wash D of the fan blades 40. The top control surface performs an important function when the aero flap is raised to the substantially horizontal position to varying positions to 45° downward, shown in FIG. 7. The down wash D forms a high dynamic pressure on the control surface causing a lateral vector flow V, as illustrated in FIG. 7. The down wash is caused to stagnate on the upper control surface and generate a higher pressure to apply the desired attitude adjustment, and secondly the air flow through the fan assembly 12 is obstructed providing a decrease in the effective lift. This simplified arrangement eliminates the need to modulate the operation of valves in the ducting for attitude control, as previously required in the '618 patent design. The set of side aero flaps 60, 60*a* are also specially operated in conjunction with each other by the controller U in order to provide balanced roll torque control. During horizontal flight, these flaps (when positioned so as to act through the center of gravity, approximately 15°), may also assist in control of any yaw caused by gyroscopic forces that may be generated in the area of the bearings and seal, or to assist in turning.

To further explain, in the down wash, the active position is from 45° to horizontal. At 45° down, this position gives the least downward torque. At the horizontal position there is the greatest downward torque. The aero flap 60*a* on the opposite side of the aircraft must move in coordinated fashion with the aero flap 60 to prevent lateral forces on the aircraft (see FIG. 2).

Starting from a position where both aero flaps 60, 60*a* are pointed downward, to prevent lateral movement of the aircraft, both aero flaps are moved together to the 45° up position thus no unbalanced forces are realized. Beyond this position upward, when the aero flap 60 is moved further upward to the horizontal position, the opposite aero flap 60*a* is simultaneously moved at approximately the same angular distance, but in the opposite direction downward, to counteract the creation of lateral side directing forces on the aircraft. In this fashion, a rolling torque is generated without any lateral side forces. If both lateral forces and rolling torque is desired at the same time, the opposite aero flap is altered from the above as necessary to create the desired result.

Various degrees of control over the upper control surface can be induced by movement of the aero flaps 60, 60*a* about positional axis 65. As best illustrated in FIGS. 6*b* and 7*a*, each flap 60, 60*a* also has a control axis 66 about which rotation to vary the angle of attack of the flap can be generated (see arrow A). Thus, in the horizontal flight mode when the aero flap is raised to the 15° position, for example as shown in FIG. 7, the dual actuator 61 can twist or rotate the flap 60, and in this position the angle of attack is such as to generate lift as the airflow goes up and over the top control surface. Of course, when the angle of attack is shifted to negative, as shown in FIG. 7*b*, a downward force, as represented by the arrow $A_1$, is generated. During the horizontal, high speed flight of the aircraft 10, the aero flaps are normally fixed about their positional axis and the dual actuator 61 provides the active force input. During vertical flight control operations, such as maneuvering the aircraft, each dual actuator 61 is operative to move the flap 60, 60*a* up and down and/or to pivot about the positional axis 65, as well as, during horizontal flight, in concert with movement about the control axis 66 to provide any position/angle variation. As the flaps 60, 60*a* are modulated in this manner by the controller U, full control of the aircraft 10 is attained.

A set of rear aero flaps 70, 70*a* are also provided to operate in the same manner to enhance the control function. Each rear aero flaps 70, 70*a* (one shown in FIG. 8) can be rotated about its positional axis 75 within the down wash D to provide a similar lateral control vector V in either direction. In a similar manner, each flap 70 can rotate about its control axis 76 (see FIG. 8*a*), and in concert with each other and the aero flaps 60, 60*a*, so that smooth and finely tuned attitude control is easily attained.

Figures 8, 8A, 8B:
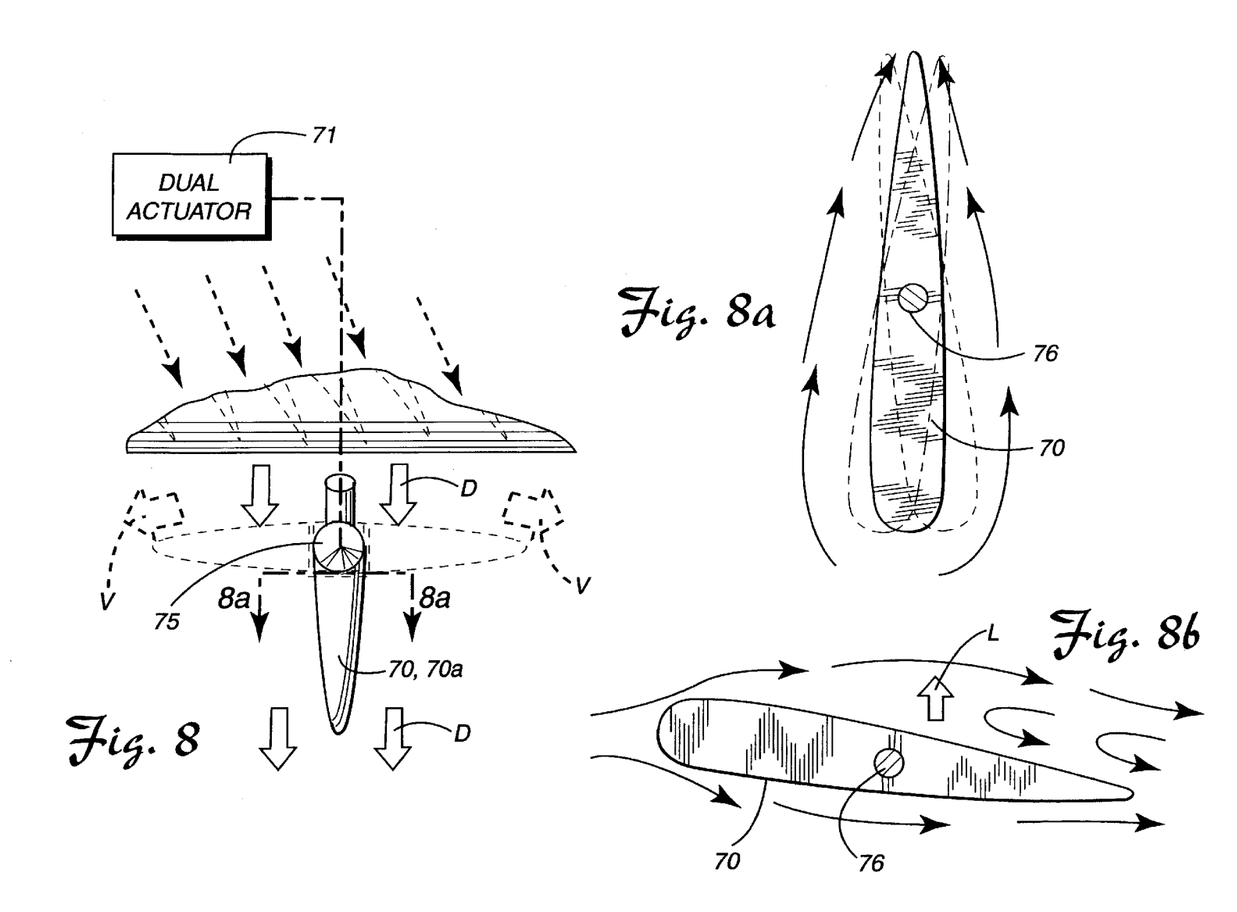
FIG. 8 is a front view of one of the set of rear aero flaps in a straight down position, with alternative lateral positions shown in dashed line view.
FIGS. 8a and 8b illustrate the manner of adjustment about the control axis of the rear aero flap that can induce either yawing motion or lift, respectively, depending on the set position about the positional axis.

When positioned to the raised dashed line horizontal position of FIG. 8, and the dual actuator 71 rotates the flap 70 about its control axis 76, it also operates to provide lift (the same applies to the identical flap 70*a* but to the opposite directions; see FIG. 2). This action is illustrated by the air flow pattern in FIG. 8*b*. When flap 70 is used in conjunction with the other aero flaps 70*a*, 60, 60*a*, very effective control of the aircraft 10, including gliding to a landing in an engine out mode, can be carried out by the pilot. In other possible configurations of the aircraft 10, flaps 70, 70*a* can be positioned adjacent each other for a split flap operation at the rear center.

With reference now to FIG. 9, the composite duct plenum 21 is illustrated in a manner to show from another perspective how the hot core gases from the fan jet engines 15–17 are transferred through the transition area T while being isolated by the annulus of cooler fan air. The orifices 26 are shown mating with the moving spaced receptors 25 of the array of nozzles 20. Each nozzle 20 tapers into a restricted outlet orifice to accelerate the exit speed of the exhaust to supersonic speed. A rotatable eyeball valve 80 is utilized with each nozzle for on-off control and for infinite control of the rotational speed of the fan assembly 12 by partial opening.

An interface hub 81 supports a plurality of air cushion modules 82 forming an annular track for vertical support by engagement along the top and bottom of an annular support race 83 of the fan assembly 12 (see also FIG. 9a). Each of the modules includes a pressurized air inlet 84. A depending skirt seal 84' allows controlled escape of the pressurized air around the periphery of the module 82, thus providing an air cushion support. A plurality of brackets 85 that are spaced equally around the periphery of the aircraft 12 supports the modules 82 individually on a gimbel 86 to allow free floating action. Idler rollers 87 on vertical shafts serve as stabilizing bearings in the horizontal plane (see FIG. 9).

Foil bearings can be used in lieu of the bearings illustrated and described. In this regard, it is contemplated that overlapping strips of non-woven or woven nylon, Teflon or Kevlar are attached to one bearing surface, such as the annular race 83. As the fan assembly 12 rotates, these low coefficient of friction strips engage the corresponding ring surface on an annular bracket held by the interface hub 81, thus providing a suitable low friction, low maintenance bearing combination.

Also mounted on an annular bracket 90 is a ring brush seal 91. Since the outer duct 21a of the composite plenum 21 isolates the hot core gases within each outlet orifice 26, only relatively cool air is allowed to be passed up and bleed around the seal 91, as noted by the flow arrows B in FIG. 9a. This means that the bearing modules 82, rollers 87 and seal 91 are not exposed to the harsh, hot core gases that remain isolated in the inner duct 21b, but instead are immersed in relatively cool fan air to eliminate heat distortion in these high tolerance components.

In summary, the redesign of the HSVTOL aircraft 10 provides results and advantages not heretofore attained in the prior art. Due to the structural changes, the exhaust of the fan jet engines 15–17 is handled in a unique manner that leads to even better performance, and most importantly a lighter weight aircraft with increased payload and extended range. By isolation of the hot core gases within the plenum 21, as well as in the feed ducts 30–32, substantially lighter and less expensive duct material can be utilized. Also, the bearings and seal are protected. Further, by providing a separate nozzle ring inboard of the fan assembly, the exhaust does not pass through the fan blades, and additional weight and cost savings with the concomitant increased payload and additional range are gained. For more efficient and better attitude control of the aircraft, the aero flaps 60, 60a, 70, 70a are positioned within the down wash D of the fan assembly 12 and can be adjusted on two axes.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention when interpreted in accordance with the breadth to which they are fairly, legally and equitably entitled.

What is claimed is:

1. A high-speed vertical take-off and land aircraft comprising:
   a disk-shaped body;
   a jet engine supported by said body;
   a feed duct for receiving and redirecting the exhaust gases from the jet engine;
   an annular rotor having a rotatable fan assembly concentric with the body;
   said fan assembly including a plurality of blades to provide vertical lift for said aircraft; said blades being airfoil-shaped and operative to scoop ambient air causing a downwash to maximize the lifting forces; and
   a nozzle ring on said rotor providing an annular nozzle array separate from said blades for receiving the exhaust gases from said feed duct and ejection to generate reaction thrust to said nozzle ring and said fan assembly, for rotation thereof,
   whereby enhanced primary lift for said aircraft is provided.

2. The high-speed vertical take-off and land aircraft of claim 1, wherein said jet engine is a fan jet and said feed duct includes a composite inner duct and outer duct for the hot core gases and fan air, respectively,
   whereby the hot core gases are isolated from said body by the fan air.

3. The high-speed vertical take-off and land aircraft of claim 2, wherein the cross section of said inner and outer ducts are substantially circular and concentric to each other.

4. The high-speed vertical take-off and land aircraft of claim 1, wherein said array of nozzles are angled downwardly at approximately 10° in the direction opposite the rotation of said fan assembly for maximum thrust efficiency for rotating said fan assembly.

5. The high-speed vertical take-off and land aircraft of claim 4, wherein said array of nozzles are provided on said ring, positioned one adjacent each of said blades.

6. The high-speed vertical take-off and land aircraft of claim 2, an annular plenum provided between said feed duct and said nozzle ring for feeding said nozzles, said plenum including an extension of said inner and outer ducts to maintain the isolation of said hot core gases.

7. The high-speed vertical take-off and land aircraft of claim 6, the inner duct extension in said plenum positioned adjacent the outer periphery to maintain maximum isolation of the hot core gases from said body.

8. The high-speed vertical take-off and land aircraft of claim 7, an annular hub provided around the outer perimeter of said body for support of said rotor, a transition zone formed by said hub between said plenum and said rotor, and at least one air bearing receiving operating air from said jet engine to rotatably mount said rotor.

9. A high-speed vertical take-off and land aircraft comprising:
   a disk-shaped body;
   a jet engine supported by said body;
   a feed duct for receiving and redirecting the exhaust gases from the jet engine;
   an annular rotor having a rotatable fan assembly concentric with the body;

said fan assembly including a plurality of blades to provide vertical lift for said aircraft; said blades being airfoil-shaped and operative to scoop ambient air causing a downwash to maximize the lifting forces;

at least one nozzle on said rotor separate from said blades for receiving the exhaust gases from said feed duct and ejection to generate reaction thrust to said fan assembly for rotation thereof; and said jet engine is a fan jet, and said feed duct includes a composite inner duct and outer duct for the hot core gases and fan air, respectively, whereby the hot core gases are isolated from said body by the fan air.

10. The high-speed vertical take-off and land aircraft of claim 9, wherein said nozzle is a part of an annular array of nozzles in a ring on said rotor, one nozzle positioned adjacent each of said blades.

11. The high-speed vertical take-off and land aircraft of claim 10, wherein said nozzle ring is inboard of said blades of said fan assembly.

12. The high-speed vertical take-off and land aircraft of claim 10, an annular plenum provided between said feed duct and said nozzle ring for feeding said nozzles, said plenum including an extension of said inner and outer ducts to maintain the isolation of said hot core gases.

13. A high-speed vertical take-off and land aircraft comprising:

a disk-shaped body;

a jet engine supported by said body;

a feed duct for receiving and redirecting the exhaust gases from the jet engine, an annular rotor having a rotatable fan assembly concentrac with the body;

said fan assembly including a plurality of blades to provide vertical lift for said aircraft; said blades being airfoil-shaped and operative to scoop ambient air causing a downwash to maximize the lifting forces; and said fan assembly defining an annular flow channel for the lifting air flow across said blades; at least one flap positioned substantially only in the flow path of the fan assembly to change the lifting flow characteristic of said fan assembly, whereby enhanced attitude control of said aircraft is obtained.

14. The high-speed vertical take-off and land aircraft of claim 13, wherein said flow channel extends in a non-axial direction angled inwardly toward said body to provide enhanced lifting effect of said aircraft.

15. The high-speed vertical take-off and land aircraft of claim 14, wherein the angle of said channel extends in the range of 20°–25° to the vertical axis of the aircraft.

16. A high-speed vertical take-off and land aircraft comprising:

a disk-shaped body, a jet engine supported by said body;

a feed duct for receiving and redirecting the exhaust gases from the jet engine;

an annular rotor having a rotatable fan assembly concentric with the body;

said fan assembly including a plurality of blades to provide vertical lift for said aircraft, said blades being airfoil-shaped and operative 10 scoop ambient air causing a downwash to maximize the lifting forces; and at least one aero flap associated with said blades of said fan assembly substantially only for modifying the annular air flow path generated by said blades for attitude control of the aircraft.

17. The high-speed vertical take-off and land aircraft of claim 16, wherein a plurality of flaps are associated with said blades within the annular air flow path.

18. The high-speed vertical take-off and land aircraft of claim 17, the flaps including at least one flap on each side and on the rear of said aircraft positioned in the downwash of said fan assembly to cause stagnation on the upper surface and obstruction of said annular air flow for decreasing the lift when turned across the path during vertical flight.

19. The high-speed vertical take-off and land aircraft of claim 18, said flaps having a substantially air foil shape along a control axis; an actuator for each of said flaps to rotate said flaps toward and away from said air flow path along a positional axis normal to said control axis to vary the lift and provide attitude control during vertical flight.

20. The high-speed vertical take-off and land aircraft of claim 19, said actuator being effective to provide a twist of said flaps along said control axis to vary the lift and down force during horizontal flight.

* * * * *

UNITED STATES PATENT AND TRADEMARK OFFICE
CERTIFICATE OF CORRECTION

PATENT NO.    : 6,382,560 B1
DATED         : May 7, 2002
INVENTOR(S)   : Gordon Y.W. Ow It is certified that error appears in the above-identified patent and that said Letters Patent is hereby corrected as shown below:

<u>Column 13,</u>
Lines 33-34, replace "concentrac" with -- concentric --.

<u>Column 14,</u>
Line 18, replace "10" with -- to --.

Signed and Sealed this

Twenty-fifth Day of June, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.   : 6,382,560 B1  Page 1 of 1
DATED        : May 7, 2002
INVENTOR(S)  : Gordon Y.W. Ow It is certified that error appears in the above-identified patent and that said Letters Patent is hereby corrected as shown below:

<u>Column 4,</u>
Line 56, delete "rat".

Signed and Sealed this

Third Day of May, 2005

JON W. DUDAS
*Director of the United States Patent and Trademark Office*